UNITED STATES PATENT OFFICE.

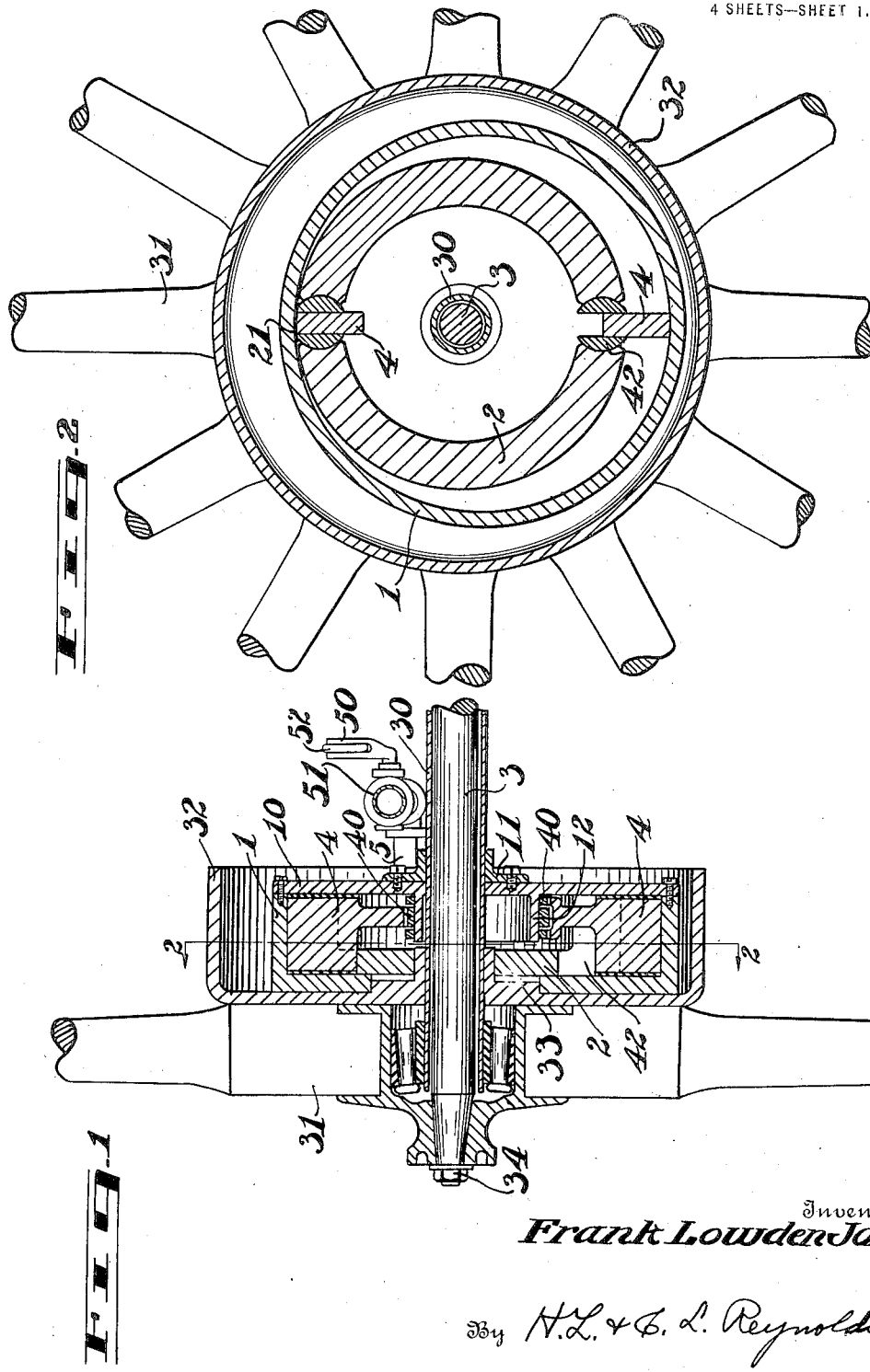

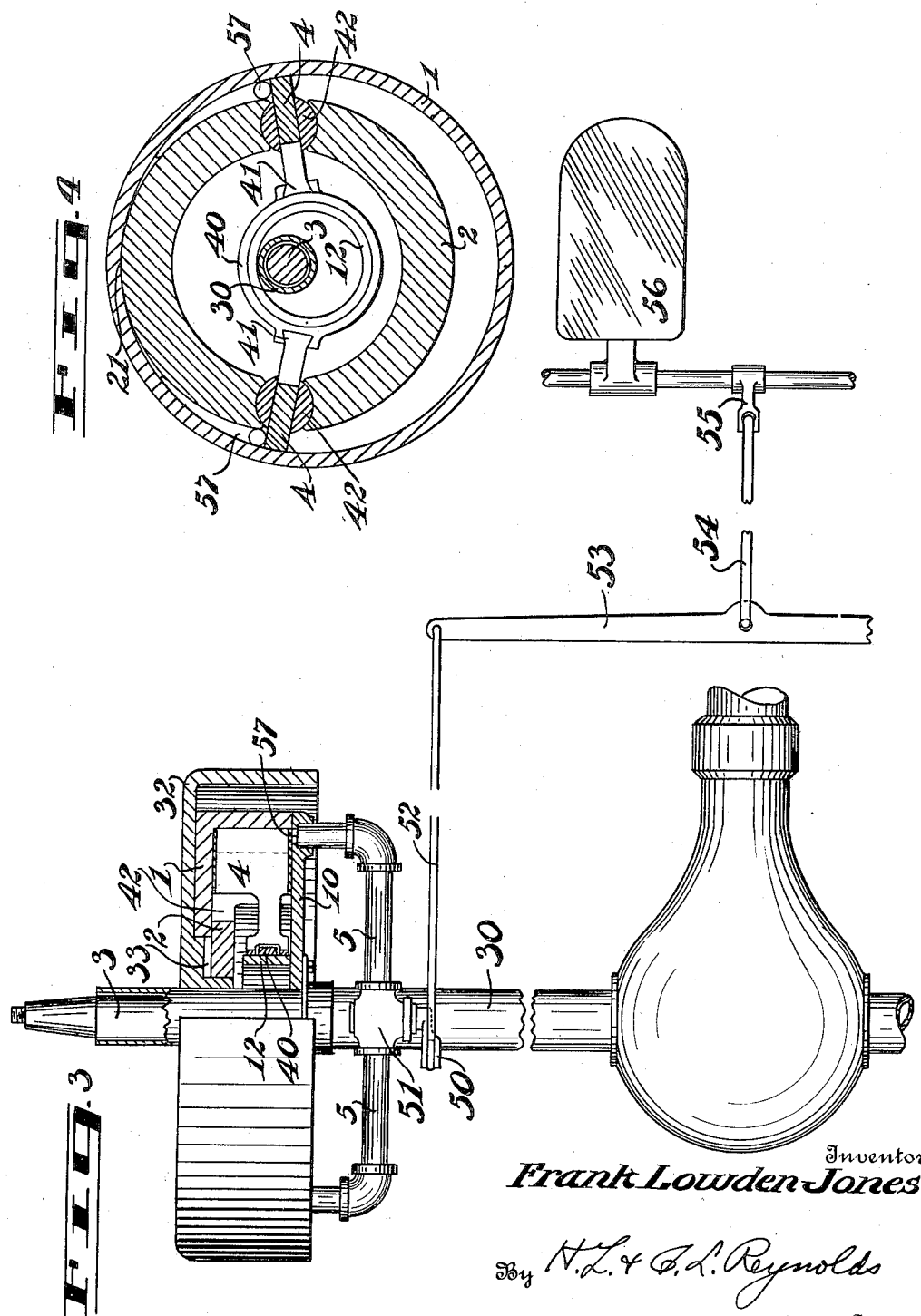

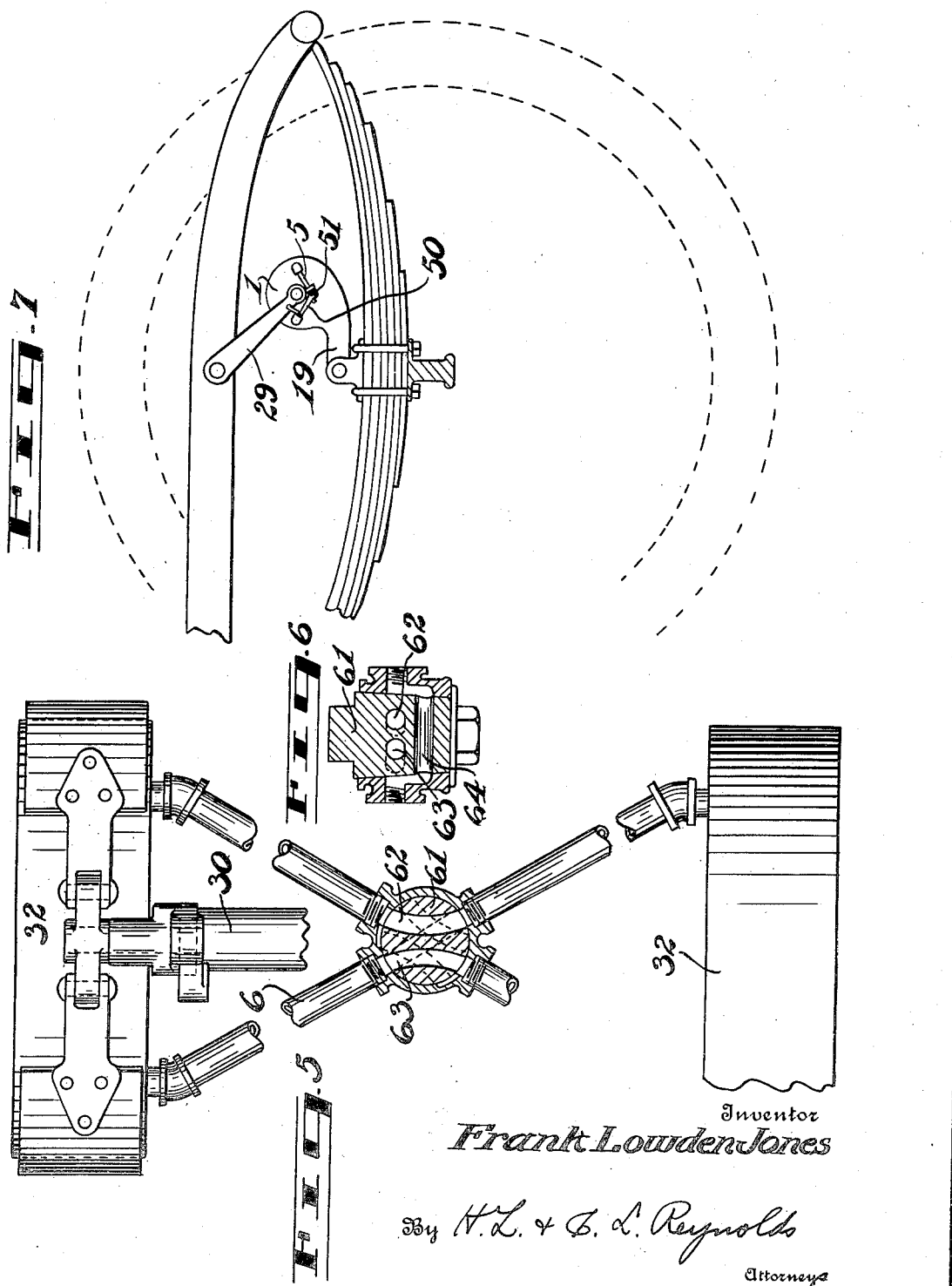

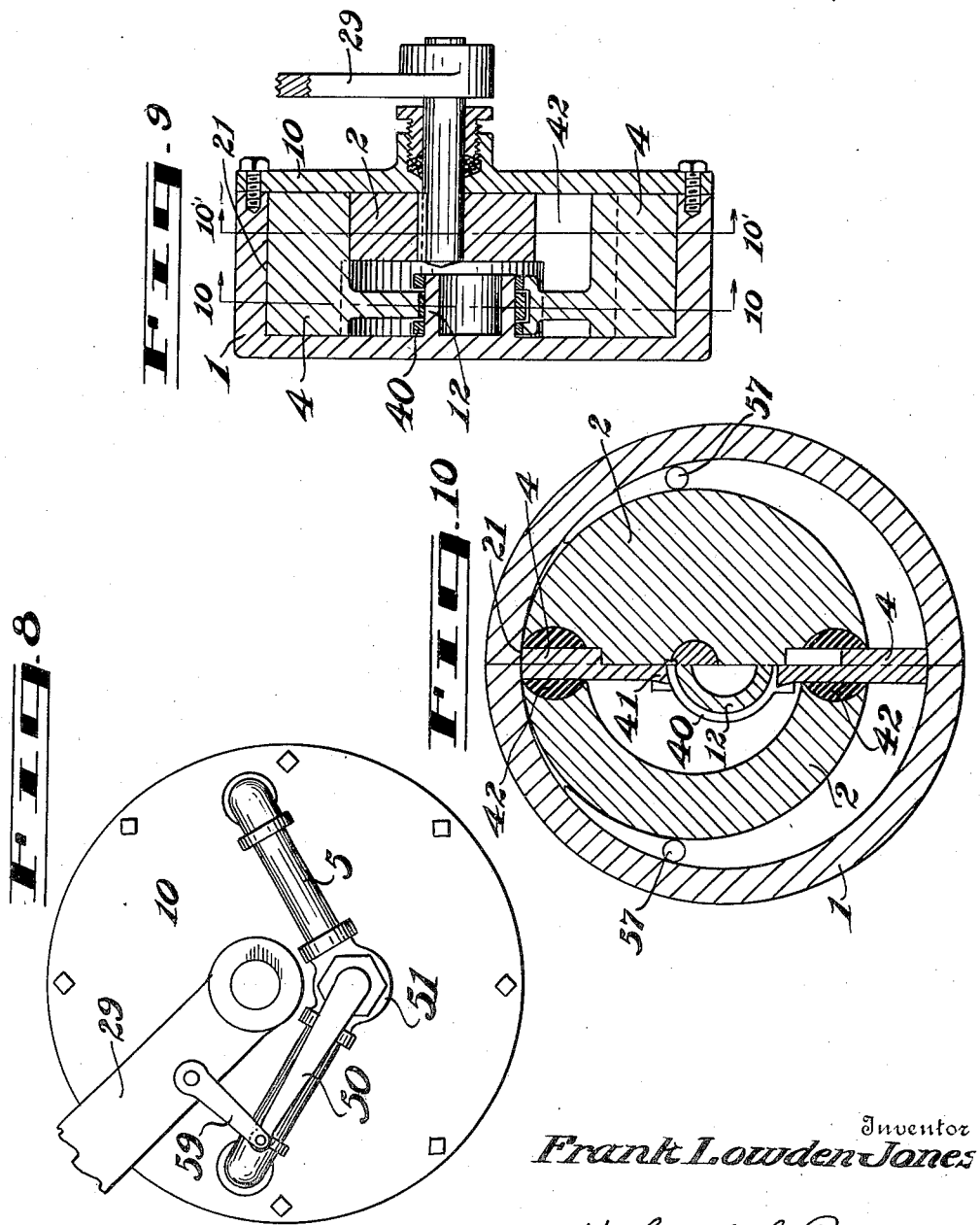

FRANK LOWDEN JONES, OF SEATTLE, WASHINGTON.

FLUID BRAKE.

1,403,031.  Specification of Letters Patent.  Patented Jan. 10, 1922.

Application filed May 10, 1920. Serial No. 380,297.

*To all whom it may concern:*

Be it known that I, FRANK LOWDEN JONES, a citizen of the United States of America, and resident of the city of Seattle, in the county of King and State of Washington, have invented certain new and useful Improvements in Fluid Brakes, of which the following is a specification.

My invention relates to an improvement in fluid brakes, wherein means are employed for creating a high-pressure portion and a low-pressure portion within a casing, these portions being in communication, together with means for regulating the rate of flow of fluid from one portion to the other.

The principal object of my invention is to provide an apparatus of the character described wherein communication between the high and low pressure portions varies between two braking limits, at one limit being freely open to provide no braking effect, and at the opposite limit being locked, if desired, against relative movement of the parts.

Another object of my invention is to provide a brake formed of two parts, one rotative relative to the other, and filled with a suitable fluid so directed and controlled that it will form a braking union between the two relatively movable parts when desired.

Another object of my invention is to provide simplified means for operating and controlling such fluid brakes.

Other objects may be ascertained from an inspection of the following specification and claims.

My invention comprises those novel parts and combinations thereof which are shown in the accompanying drawings, described in the specification, and particularly defined by the claims terminating the same.

In the accompanying drawings I have shown my invention in a form which is now preferred by me.

Figure 1 is an axial section through my brake, shown attached to an automobile wheel and axle housing.

Figure 2 is a section on line 2—2 of Figure 1, looking in the direction of the arrows.

Figure 3 is a plan view of the rear end of an automobile transmission, illustrating my brake and the control therefor, a portion of the brake being shown in section.

Figure 4 is a section on line 2—2 of Figure 1, looking in the direction opposite the arrows.

Figure 5 is a plan view of an automobile rear end, illustrating a means of controlling both brakes from a single valve, the valve being shown in section.

Figure 6 is an axial section through the valve shown in Figure 5.

Figure 7 illustrates my device as it might be employed for a vehicle shock absorber.

Figure 8 is an elevation of the shock absorber, illustrating the automatic control device.

Figure 9 is an axial section through the shock absorber.

Figure 10 is a transverse section of the shock absorber, each half being taken on different lines, 10—10 and 10'—10', of Figure 9.

The principles employed in my device may be employed in shock absorbers as well as in brakes, and other uses may be found to which it is adaptable. While I shall describe the invention principally in its relation to brakes, I do not desire to be limited only to such use.

In carrying out my invention I employ two parts, one being rotatable with respect to the other. The outer casing 1 I prefer to fix, through the medium of its cap 10 and the flanged collar 11, or by any other suitable means, to the rear axle housing 30 of an automobile. This casing is filled with a suitable fluid, preferably a freely-flowing liquid, and is tightly closed. Within this casing 1 is mounted a rotor 2, rotatable with the wheel 31 and the axle 3, in such manner that it produces, together with the inner wall of the casing 1, a portion of the casing where the pressure is increased, with a corresponding portion opposite, where the pressure is decreased. This is brought about by retarding, at one point, the flow of fluid around about within the casing 1, as by mounting the rotor 2 eccentrically therein. As I prefer to form my device, the rotor and casing are tangent at one point, as at 21. For convenience in assembling and disassembling the wheel and brake parts, the usual brake drum 32, which is secured to the wheel 31, may be provided with teeth 33 meshing with corresponding teeth on the rotor 2, and held in engagement therewith by a nut 34 which secures the wheel upon the axle.

The central portion of the rotor 2 is recessed to receive a hub 12, which is secured upon the casing 1 or the cap 10 secured thereto, and which is concentric with the casing. At one or more points the rotor 2 is slotted, and through these slots project the piston plates 4. The number of these is not important; one only may be used, though I prefer to employ two or more. These plates 4 are mounted upon the hub 12 to project radially therefrom at all times. This may be accomplished by keying them in rings 40, as shown at 41 in Figure 4. To take up any side play betwen the rotor 2 and the plates 4, the slots in the rotor may be cylindrical in shape, and half cylinders 42 are placed therein at each side of the piston plate 4. This mounting permits a slight amount of rocking of the piston relative to the rotor 2, and yet leakage is prevented. Each piston plate 4, it is apparent, must be fixed to its own individual ring or rings 40, independent of the other pistons.

As the pistons 4 advance with the rotor they will push the fluid before them and they will cause it to be compressed as each piston approaches the point of nearest approach, or the point of tangency 21, that is, as the volume of the chamber before the piston 4 and between the rotor 2 and casing 1 decreases. Similarly, the pressure behind each piston will be decreased as the volume of the same chamber increases throughout the travel of the piston. Ordinarily this pressure should be equalized, and to permit this I provide a by-pass 5 connecting the two chambers by means of ports 57 at opposite sides of the point of tangency 21 of the piston and rotor. Normally this by-pass 5 is freely opened and of such area that it will permit free passage of the fluid therethrough to equalize the pressure referred to above. There is, however, a valve 51 in this by-pass which may be turned to restrict the passage more or less. By restricting this passage the rate of flow of the fluid therethrough is decreased, and a braking effect is secured between the rotor 2 and the casing 1. If the valve 51 is closed entirely the brakes are set and locked in place. This locking feature is advantageous also when it is desired to leave the car for a time.

The means for controlling the valve 51, in the simplest type of construction, may be such as are now used for the ordinary brake band. They may consist, as shown in Figure 3, of rods 52 secured to each of the levers 50 which are secured upon the valve stem, these rods 52 being connected by an equalizer 53. A rod 54 may connect the equalizer, with a lever 55, which may be turned by pressure of the driver's foot upon the pedal 56.

In the type of construction shown in Figure 5 the brake units at each side of the vehicle are not self-contained units, but the high pressure portion of one chamber is connected with the low pressure portion of the brake chamber opposite, as by means of the by-pass pipes 6. A valve 61 is located at a central point where the two pipes 6 cross, and is so constructed that ordinarily its ports will direct the fluids across from the high pressure portion of one brake to the low pressure portion of the opposite brake. In the position shown in Figure 5, however, the brakes are set and locked and the port 62 connects the two high pressure chambers while the port 63 connects the two low pressure chambers. A port 64, shown in Figure 6, ordinarily connects a high pressure port with a low pressure port but in the position shown in Figure 5 this port is shown out of communication or blind. The normal position of the ports is shown in Figure 5 in dotted lines.

The same features of construction may be employed in a shock absorber, securing the outer casing 1 to one portion of the chassis by an arm 19 and securing the rotor, which will only oscillate, to a relatively movable portion of the chassis by an arm 29, as shown in Figure 7. In this type of construction the action of the valve 5 should be automatic, and in order to secure this I connect the valve lever 50 by a suitable link 59 to the arm 29, so that as the two parts of the chassis to which the arms 19 and 29 are respectively connected approach each other, the valve 5 will be closed more or less, and thus resistance is set up within the casing to the oscillation of the parts, in the manner described above.

In connection with a brake employing two or more pistons 4, it should be noted that in order to secure longer and more effective braking action, the port 57 should be exposed by the piston next preceding by a relatively long interval, as a considerable quantity of fluid must be sent through the by-pass 5, and there must normally be sufficient time for this fluid to pass through. Also, one piston must not begin compressing fluid until the piston next preceding it has uncovered the port 57 to provide an outlet for the fluid in front of this piston. The port 57 must, however, extend practically to the point of tangency 21, as compression continues until the piston passes this point. By the same reasoning, the low-pressure port 57 must be formed in the same manner.

What I claim as my invention is:

1. In a fluid brake, in combination, a fixed outer casing containing a fluid, a rotor mounted eccentrically and rotatable therein, a piston rotatable with said rotor and contacting with the inner wall of the casing, said piston being mounted concentrically within the casing and projecting through the rotor, means for by-passing the fluid within the casing from one side to the other of the point nearest approach of the rotor and casing, and means for retarding at will the flow of fluid through said by-pass.

2. In a fluid brake, in combination, a fixed outer casing containing a fluid, a rotor mounted eccentrically and rotatable therein, said rotor and casing being tangent, a piston concentrically and rotatably mounted within said casing and projecting through said rotor to rotate therewith, said piston contacting at all times with the inner walls of the casing, means for by-passing the fluid within the casing from one side to the other of the point of tangency of the rotor and casing, and means for controlling the rate of flow of the fluid through said by-pass.

3. In a fluid brake, in combination, a fixed outer casing containing a fluid, a rotor mounted eccentrically and rotatable therein, said rotor and casing being tangent, a plurality of angularly spaced pistons rotatable with said rotor and contacting at all times with the inner walls of the casing, said casing having a by-pass from one side to the other of the division formed by two pistons, and means for controlling the rate of flow of the fluid through said by-pass.

4. In a fluid brake, in combination, a fixed outer casing containing a fluid, a rotor mounted eccentrically and rotatable therein, said rotor and casing being tangent, a hub within the rotor and concentric with the outer casing, a piston rotatably and radially mounted upon said hub and projecting through the rotor, and contacting at all times with the inner walls of the casing in the chamber formed between said casing and the rotor, said casing having a by-pass from one side to the other of the point of tangency of the rotor and casing, and means for controlling the rate of flow of the fluid through said by-pass.

5. In a fluid brake, in combination, a fixed outer casing containing a fluid, a rotor mounted eccentrically and rotatable therein, said rotor and casing being tangent, a hub within the rotor and concentric with the outer casing, a plurality of independent rings rotatably mounted upon said hub, a plurality of piston plates each secured radially upon its individual ring and projecting through the rotor, and filling the space between the rotor and the inner wall of the casing, said casing having a by-pass from one side to the other of the point of tangency of the rotor and casing, and means for controlling the rate of flow of the fluid through said by-pass.

6. In a vehicle, in combination, opposite wheels, separate brakes for each of said wheels each comprising a fixed outer casing filled with fluid and a rotor therein, and operable to produce a high-pressure portion and a low pressure portion in each casing, by-pass pipes connecting the high-pressure portion of each casing with the low-pressure portion of the opposite casing, and means for regulating the rate of flow of the fluid through said by-pass pipes.

7. In a vehicle, in combination, opposite wheels, separate brakes for each of said wheels each comprising a fixed outer casing filled with fluid and a rotor therein operable to produce a high-pressure portion and a low-pressure portion in each casing, by-pass pipes normally connecting the high-pressure portion of each casing with the low-pressure portion of the opposite casing, and meeting at a common point, and a valve positioned at the common meeting point of said by-pass pipes, and operable to regulate the rate of flow of the fluid therethrough.

8. In a vehicle, in combination, opposite wheels, separate brakes for each of said wheels each comprising a fixed outer casing filled with fluid and a rotor therein operable to produce a high-pressure portion and a low-pressure portion in each casing, by-pass pipes normally connecting the high-pressure portion of each casing with the low-pressure portion of the opposite casing, and meeting at a common point, and a single valve positioned at the common meeting point of said by-pass pipes and operable to regulate the rate of flow of the fluid therethrough, said valve being operable at will to connect the high pressure or the low pressure portions of one casing with the high pressure or low pressure portions respectively, of the opposite casing.

Signed at Seattle, Washington, this 4th day of May, 1920.

FRANK LOWDEN JONES.